United States Patent [19]

Taniguchi et al.

[11] Patent Number: 5,235,582
[45] Date of Patent: Aug. 10, 1993

[54] PHOTOCHROMIC OPTICAL DISK READ/WRITE APPARATUS WHICH PREVENTS DETERIORATION OF THE STORED INFORMATION DURING TRACKING AND READING

[75] Inventors: Hitoshi Taniguchi; Satoru Tanaka, both of Iruma, Japan

[73] Assignee: Pioneer Electronic Corporation, Tokyo, Japan

[21] Appl. No.: 653,550

[22] Filed: Feb. 11, 1991

[30] Foreign Application Priority Data

Jul. 3, 1990 [JP] Japan .................................. 2-175968

[51] Int. Cl.$^5$ ........................................... G11B 7/095
[52] U.S. Cl. .............................. 369/44.26; 369/44.38; 369/108; 369/275.2
[58] Field of Search ............... 369/44.26, 44.37, 44.38, 369/108, 109, 120, 121, 275.2

[56] References Cited

U.S. PATENT DOCUMENTS

| | | | |
|---|---|---|---|
| 4,703,469 | 10/1987 | Pettigrew et al. | 369/108 X |
| 4,829,505 | 5/1989 | Boyd et al. | 369/120 X |
| 4,974,111 | 11/1990 | Platte et al. | 360/14.1 |
| 5,107,483 | 4/1992 | Nakajima et al. | 369/108 |
| 5,113,387 | 5/1992 | Goldsmith et al. | 369/121 X |

Primary Examiner—W. R. Young
Attorney, Agent, or Firm—Sughrue, Mion, Zinn, Macpeak & Seas

[57] ABSTRACT

A photochromic optical disk read/write apparatus is provided having, in addition to the beams of light for reading and writing, a tracking light beam which is used for tracking during the reading, erasing, and writing of information signals and a standby state so that deterioration in the recording medium quality can be lessened.

14 Claims, 8 Drawing Sheets

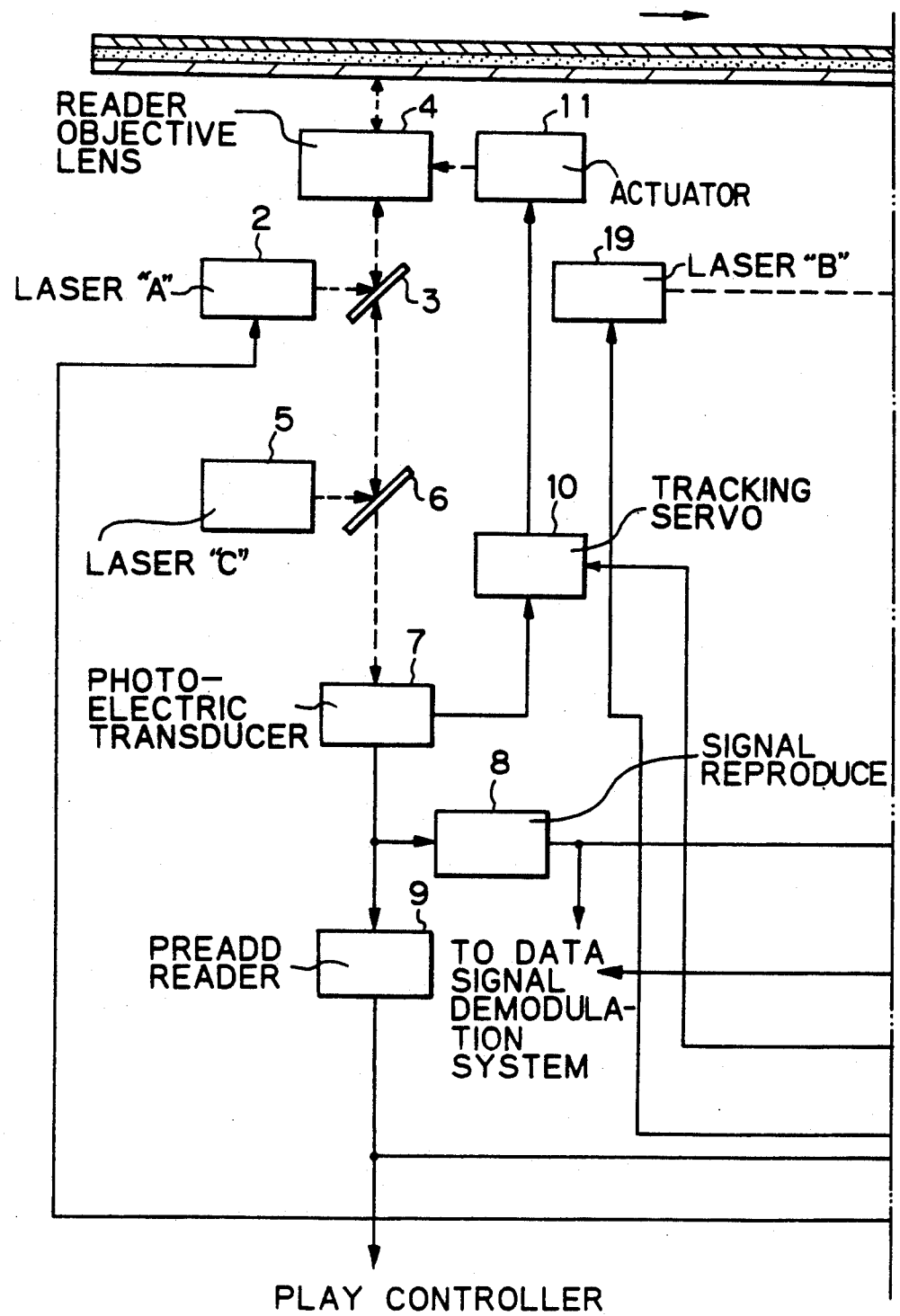

PHOTOCHROMIC OPTICAL DISK READ/WRITE APPARATUS WHICH PREVENTS DETERIORATION OF THE STORED INFORMATION DURING TRACKING AND READING

BACKGROUND OF THE INVENTION

1. Field of the Invention

The present invention relates to a photochromic optical disk read/write apparatus for writing and reading of data signals to and from a photochromic recording medium.

2. Description of the Related Art

Organic photochromic material is known as a chemical compound capable of coloring and discoloring in response to light emissions. More particularly, as shown in a spectral distribution diagram of light absorption of FIG. 2, such an organic photochromic material changes from the stable state X to the metastable state Y for putting a color on when absorbing an intensity of light having a waveform B and when absorbing at the metastable state Y a different light or heat having a waveform A, will turn back to the original state and become discolored. With the application of such a reversible optical or thermal isomeric reaction, an EDRAW disk for recording at relatively higher density will be eligible.

A read/write apparatus for recording and reproducing information signals to and from such a photochromic optical disk is disclosed in Japanese Patent Application 01-199643 (1989).

That read/write apparatus employs laser beams of 350-nm wavelength for write operation and of 632.8-nm wavelength for read or erase operation. The photochromic optical disk has tracks provided on the primary surface thereof. The tracks are specified by a series of pregrooved surface shaping variations or prepits which represent address information of data blocks (thus, will be termed as "prepits" hereinafter) and are separated by given angles into sections spaced at radially equal distances. Then, arranged along the track are a row of coloring regions (referred to as "coloring pits" or "data pits" hereinafter) of a photochromic recording layer for optical recording of information signals.

For use in tracing of the track, an eligible tracking beam is prepared by lowering in the intensity the light beam for reading and erasing at the read and erase mode and the light beam for writing at the write mode.

The prepits are thereby detected by a relatively lower intensity of light beam for tracking. However, the exposure to the lower beams after repeated tracking actions will cause gradual declination in the quality of a recorded or erased state. Particularly, tracing of the same track during the pause action will accelerate deterioration of the recorded or erased state quality.

SUMMARY OF THE INVENTION

It is thus an object of the present invention to provide a photochromic optical disk read/write apparatus in which deterioration in the recorded and erased state quality during tracking or reading of address signals can be minimized.

In accordance with the present invention, the photochromic optical disk read/write apparatus comprises: reader means for reading information signals recorded on the track, which is defined by a series of prepits, of a photochromic optical disk with the use of a reading beam of light which is focused on a reading point; writer means for writing desired information signals on to the track with a writing beam of light which is focused on a writing point; signal processor means for processing an information signal read out by the reader means and for, feeding a desired information signal to be recorded to the writer means; and in particular, tracking means provided integrally with the reader and writer means for emitting a tracking beam of light having a wavelength which is not sensed by the photochromic optical disk and for detecting the reflection of the tracking light beam.

In operation of the photochromic optical disk read/write apparatus of the present invention, the tracking is conducted with the use of a laser beam having a wavelength which is not sensed by a photochromic recording medium.

BRIEF DESCRIPTION OF THE DRAWINGS

FIG. 1 illustrates in block diagram format, the positional relation between FIGS. 1A and 1B.

FIGS. 1A and 1B, when combined, are block diagrams showing one embodiment of the present invention;

DETAILED DESCRIPTION OF A PREFERRED EMBODIMENT

Figure 1B:
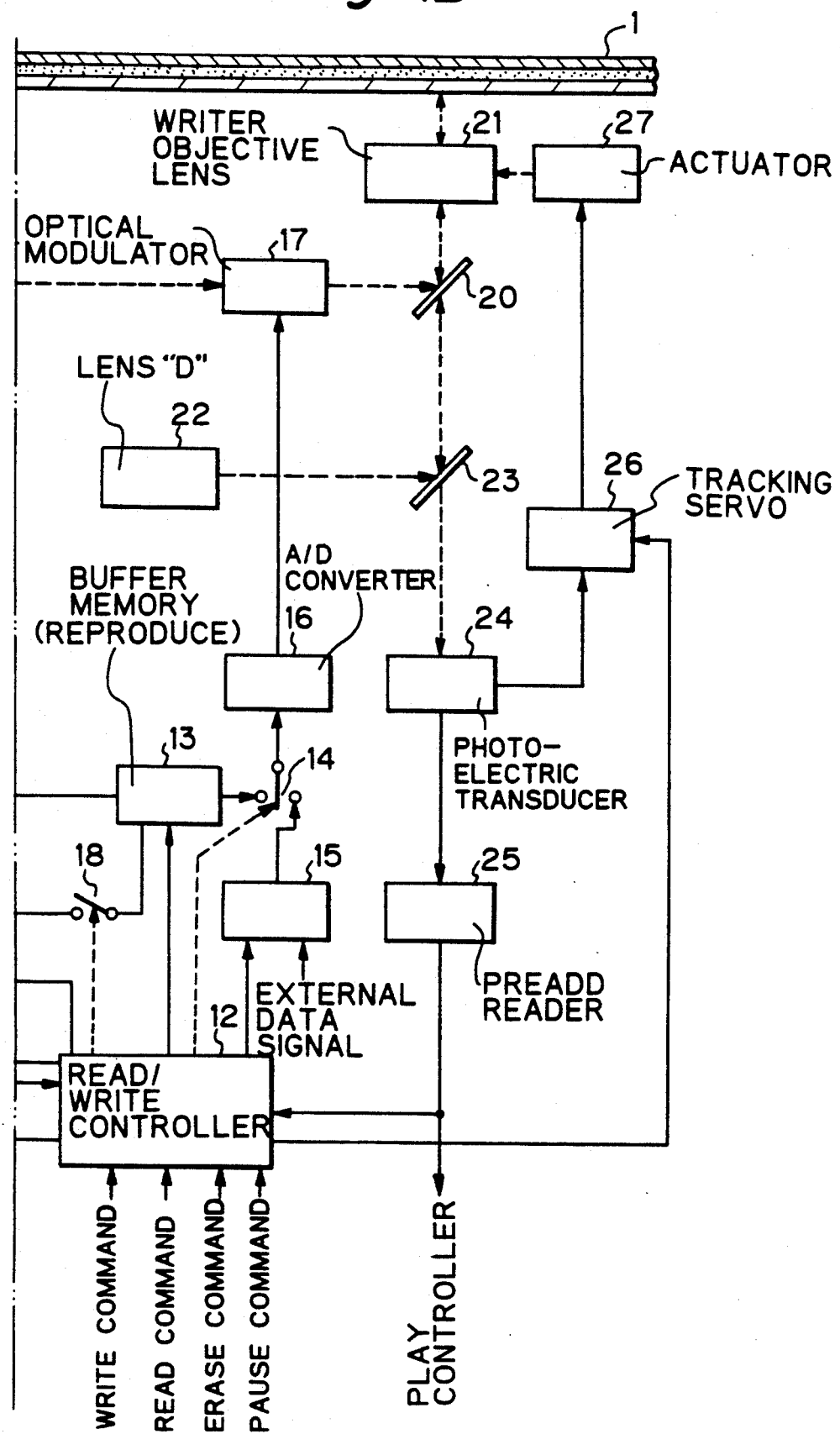
Figure 2:
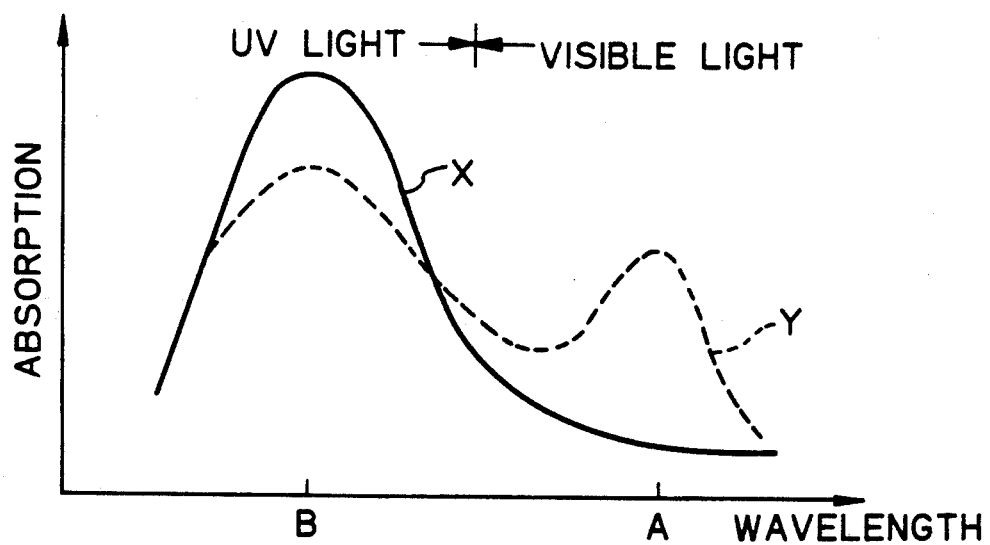
FIG. 2 is an explanatory diagram showing the characteristics of a photochromic recording medium.

FIGS. 1A and 1B, when combined, are block diagrams of a photochromic disk read/write apparatus showing one embodiment of the present invention, in which a disk having an organic photochromic layer therein is driven and controlled for rotation at a given speed by a spindle servo motor not shown. Denoted by the letter A is a beam of light for example, 560 nm in wavelength which is emitted from a laser emitter 2, reflected by a half mirror 3, and transmitted to a reader objective lens system 4. The reader objective lens system 4 converges the light beam A by focus servo action to form a light spot of a predetermined diameter on the track and allows the light spot to follow the track by tracking servo action for tracing the prepits.

The reflected light which has been modulated by color pits on the track is transmitted through the half mirror 3 and another half mirror 6 to a photoelectric transducer 7 where it is converted into an electric signal having a level of energy corresponding to the intensity of the reflected light and then, delivered as an RF signal to a signal reproducer 8. The signal reproducer 8 demodulates the RF signal to a PWM signal and after digitalization, delivers it to both a buffer memory 13 and a signal demodulation circuit not shown. The laser emitter 2, the half mirror 3, the reader objective lens system 4, and the photoelectric transducer 7 are thus arranged in combination constituting a reader means.

Also, a laser emitter 5 is provided for emitting a beam of light C having such a wavelength of e.g. 830 nm or 780 nm as causing no reversible action on the photochromic recording medium. The light beam C from the laser emitter 5 is reflected by the half mirror 6 and transmitted across the half mirror 3 to the reader objective lens system 4. The reader objective lens system 4 then converges the light beam C by focus servo action, projecting a specifically sized spot of light on to the track. Similarly, the reflected light of the beam C which has been modulated by prepits on the track is transmitted through the half mirrors 3 and 6 and fed to the photoelectric transducer 7.

The photoelectric transducer 7 delivers a so-called RF signal of energy level corresponding to the total intensity of the reflected light to the signal reproducer 8 and to a preaddress reader 9 and also, generates a tracking error signal representing a variation in the reflected light on the light-sensitive surface of the photoelectric transducer 7 and delivers it to a tracking servo circuit 10. The tracking servo circuit 10 then actuates an actuator 11 for attenuating the energy level of the tracking error signal.

The actuator 11 is provided for positioning the reader objective lens system 4 to a reading point on the track.

Upon receiving the RF signal, the preaddress reader 9 picks up an address signal assigned to the front end of each data block and transfers it to a read/write controller 12 and a play controller not shown. Accordingly, the laser emitter 5, the half mirror 6, the reader objective lens system 4, the photoelectric transducer 7, the tracking servo circuit 10, and the actuator 11 constitute in combination a tracking means in the reader means for performing a tracking action during the reading or erasing of information signals or the standby state.

The play controller is arranged for controlling all of the actions in the player: for example, it delivers an erase, write, or read command and provides a timing signal for elimination of the command upon receiving the address signal of a data block or an instruction signal for control of the demodulated information signal.

The read/write controller 12 consists mainly of a microprocessor, a ROM, and a RAM. The signal reproducer 8 demodulates a read signal from the preaddress reader 9 into a PWM signal which is in turn digitalized and transferred to both the buffer memory 13 and the signal demodulation circuit, not shown. Upon receiving a read command, the buffer memory 13 delivers a memory signal to one of the two input terminals of a signal selector switch 14.

The other input terminal of the signal selector switch 14 is coupled to a buffer memory 15 which holds information signals to be recorded onto the disk. The signal selector switch 14 transmits either of the two input signals, in response to a selection command from the read/write controller 12, via an A/D converter 16 to the modulation input of an optical modulator 17.

The buffer memory 13 also sends a signal output to the input of a switch 18 which in turn transmits the same to the information signal demodulation circuit, not shown, in response to a delivery command from the read/write controller 12. Thus, the signal reproducer 8, the preaddress reader 9, the buffer memories 13 and 15, the signal selector switch 14, the A/D converter 16, the switch 18, and the read/write controller 12 constitute along with another preaddress reader 25 a signal processor means.

The optical modulator 17 is provided for intermittent transmission of a beam of ultraviolet light B having a wavelength of e.g. 440 nm and emitted from a laser emitter 19. The light beam B is directed by a half mirror 20 to a writer objective lens system 21. The writer objective lens system 21 converges the light beam B by focus servo action forming a specifically sized spot of light on the track of the disk and allows the light spot to trace the track by tracking servo action. The writing of information signals to the disk is executed by projecting the light spot on to a track. Then, the laser emitter 19, the half mirror 20, the writer objective lens system 21, and the optical modulator 17 constitute in combination a writer means.

Also, provided is a laser emitter 22 which is a semiconductor laser device for emitting a beam of light D having such a wavelength, e.g. 780 or 830 nm, which causes no reversible action on the photochromic recording medium. The light beam D from the laser emitter 22 is reflected by a half mirror 23 and transmitted through the half mirror 20 to the writer objective lens system 21. The writer objective lens system 21 converge the light beam D by focus servo action projecting a specifically sized spot of light on to the track. The reflected light of the beam D which has been modulated by prepits is then transmitted across the half mirrors 20 and 23 to the photoelectric transducer 24. The photoelectric transducer 24 delivers a so-called RF signal of energy level corresponding to the total intensity of the reflected light to the preaddress reader 25 and also, generates a tracking error signal representing a variation in the reflected light on the light-sensitive surface of the photoelectric transducer 24 and delivers it to a tracking servo circuit 26. The tracking servo circuit 26 then actuates an actuator 27 for attenuating the energy level of the tracking error signal. The actuator 27 is provided for positioning the writer objective lens system 21 to a writing point on the track. Upon receiving the RF signal, the preaddress reader 25 picks up an address signal assigned to the front end of each data block and transfers it to the read/write controller 12 and the play controller, not shown. Accordingly, the laser emitter 22, the half mirror 23, the writer objective lens system 21, the photoelectric transducer 24, the tracking servo circuit 26, and the actuator 27 constitute in combination a tracking means in the writer means for performing a tracking action during the writing of information signals or the standby state.

The read/write controller 12, when receiving a pause command signal, supplies a series of one-track-jump-back command signals intermittently to the tracking servo circuit 10 or 26 during the tracking operation. The tracking servo circuit 10 or 26 in turn actuates the actuator 11 or 27 to move the reading or writing point by one track to the backward.

Although the reading and writing spots from their respective light beams A and B are commonly positioned adjacent to each other on the same track, they may be located at symmetrical points on the sam track about the center of the disk or arranged on different tracks.

The erase, write, and read procedures in the apparatus as well as the pause state will now be described in a sequence.

Figure 3:
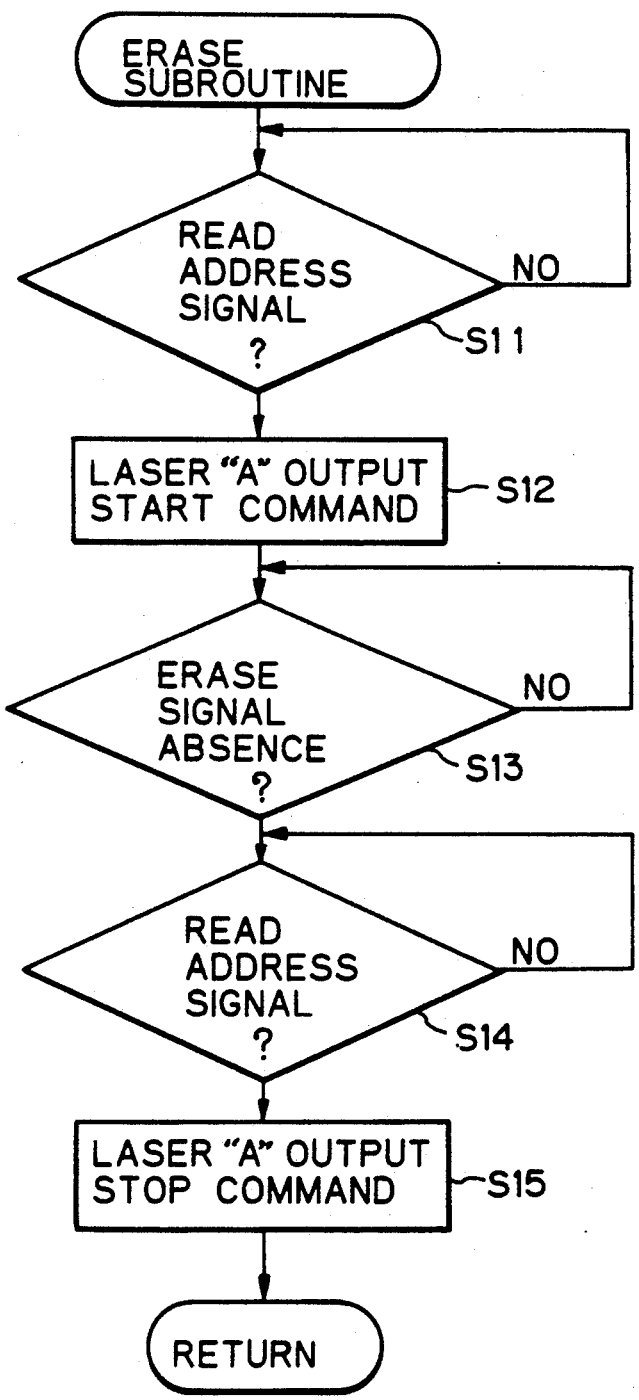
FIG. 3 is a flow chart explaining the erase action of a read/write controller 9.

The description starts with the erase procedure. The play controller generates an erase command signal when detecting the address signal from one data track earlier than that to be eliminated and will cancel the same after an address signal from the data block to be eliminated is detected. The read/write controller 12 upon receiving an erase command from the play controller carries out a subroutine for the erase operation as illustrated in FIG. 3. In operation, it is first examined whether the address signal of a data block is infed from the preaddress reader 9 or not (Step S11) and if so, the read/write controller 12 instructs the laser emitter 2 to deliver a high intensity output of the light beam A for erasing the information signals from the beginning of the data block as the light spot is located at the front end of an information signal writing area in the data block. When the high intensity light beam A is incident on the track, the recording layer of the track containing the information signals turns to a colorless form where corresponding color pits are eliminated and thus, the recorded data will be cleared off.

The prepits however remain unaffected by the emission of light while the recorded information signals (color pits) only are eliminated (Step S12).

If no erase command is given from the play controller, the information signals in the following data block should not be eliminated. It is thus examined whether an erase command is given or not and if so, the elimination of other information signals will be repeated (Step S13).

If no erase command signal is detected, it is further examined whether an address signal is supplied or not from the preaddress reader 9 for stopping the elimination of information signals at the end of the data block (Step S14).

If the address signal is detected, an instruction is released to stop the output of the laser emitter 2 in order to avoid the elimination of further information signals and the standby state is induced (Step S15). During that period, the tracking with the light beam C is conducted.

After the target data block is cleared off, the read/write controller 12 returns to its main control program.

Figure 4:
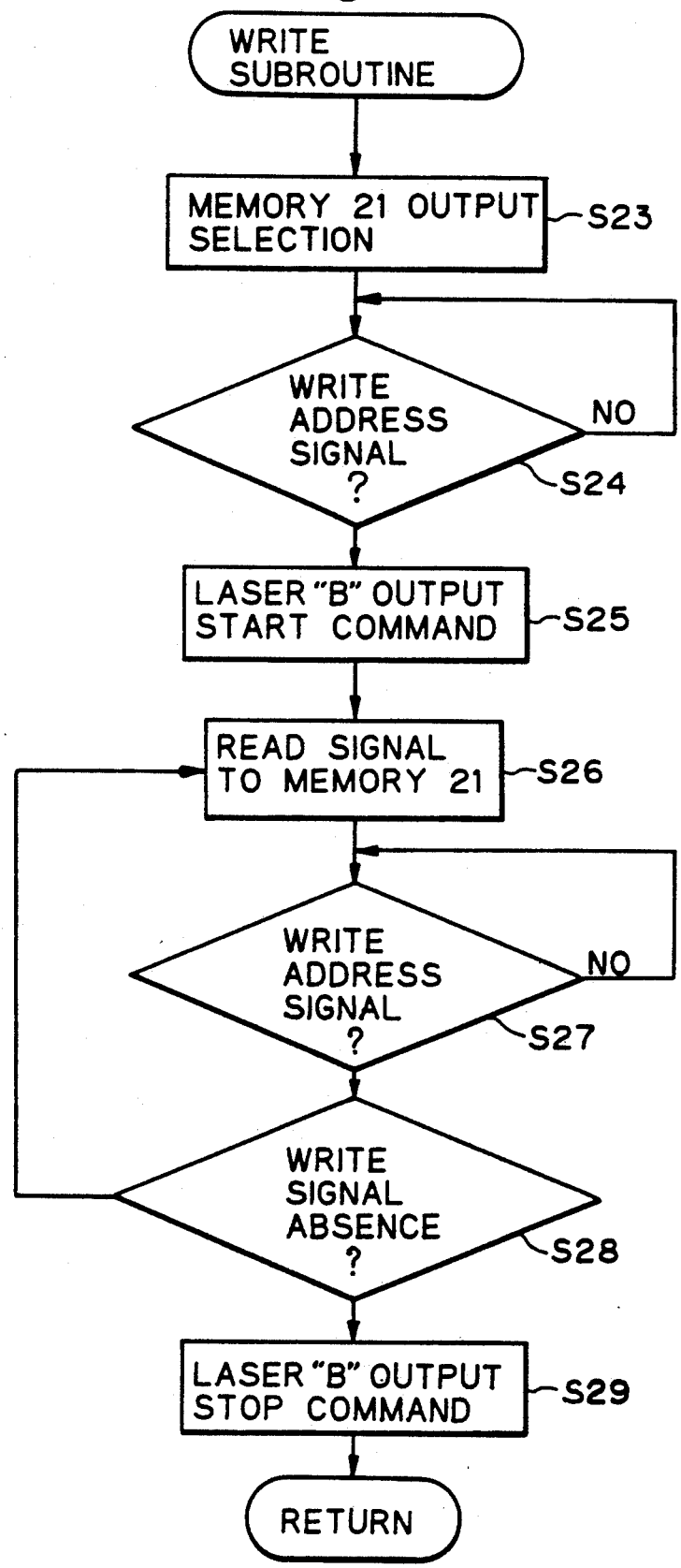
FIG. 4 is a flow chart explaining the write-in action of the read/write controller 9.

The write procedure will then be described. The writing is a sequence of procedures for recording external information signals on to a disk, in which the information signals to be recorded are fed from an external signal processor circuit not shown and then, stored in the buffer memory 15. When receiving from the play controller a write command signal which instructs the writing of external information signals on to the disk, the read/write controller 12 starts performing a subroutine of write operation, best shown in FIG. 4, after retrieving it from the main control program.

If the data block to be loaded with external information signals contains existing data, the play controller delivers an erase and a write command signals at appropriate timing to carry out the parallel operation of the erase subroutine with a write subroutine described later. Accordingly, the writing of the external information signals with the writer objective lens system 21 is implemented after the existing data is eliminated from the data block by the reader objective lens system 4, whereby reading error resulting from overwrite will be avoided. In general, the play controller controls eligible durations of the erase and write command signals respectively for matching the number of data erased blocks with that of data writing blocks. Also, it may be possible to erase a bit more data blocks than the data blocks to be recorded during the recording of audio or video signals.

In the write procedure, the read/write controller 12 actuates the signal selector switch 14 to turn to the write data (buffer memory 15) side for transferring information signals from the buffer memory 15 to the optical modulator 17 (Step S23). Upon receiving an address signal from the preaddress reader 25, the read/write controller 12 triggers the laser emitter 19 for emission of the light beam B of higher intensity in order to write external information signals down to the beginning of a recording area of the data block (Step S25). Then, it instructs the reading of desired external information signals from the buffer memory 15 (Step S26). The buffer memory 15 responds with output of the external information signals to be recorded into each data block. The output from the buffer memory 15 is then converted by the A/D converter 16 to a PWM signal which is in turn fed to the optical modulator 17. The high intensity light beam B controlled by the photoelectric modulator 17 for intermittent transmission is projected on to the track to record from the front end of a data block which contains no data. Corresponding color pits of the tinted form Y to the information signals are then developed in the recording layer of the disk. When an address signal of the next data block is detected from the preaddress reader 25 (Step S27), it is then examined whether a write command is still eligible or not (Step S28). If the write command signal is present, the procedure from Step S26 to Step S28 is repeated for recording further external information signals into another target data block.

If no write command exists, the writing of data is ended by ceasing the emission of the light beam B and the standby state is induced (Step S29) prior to returning to the main control program.

For conversion to optical energy, the external information signals are supplied from the buffer memory 15 via the signal selector switch 14 and the A/D converter 16 to the optical modulator 17 where they are impressed on to the intermittent light beam B. Then, the intermittent light beam B is projected by the writer objective lens system 21 on to the track developing pits of the tinted form Y in the recording layer.

The read procedure will now be described referring to FIGS. 5-A and 5-B.

Figure 5A:
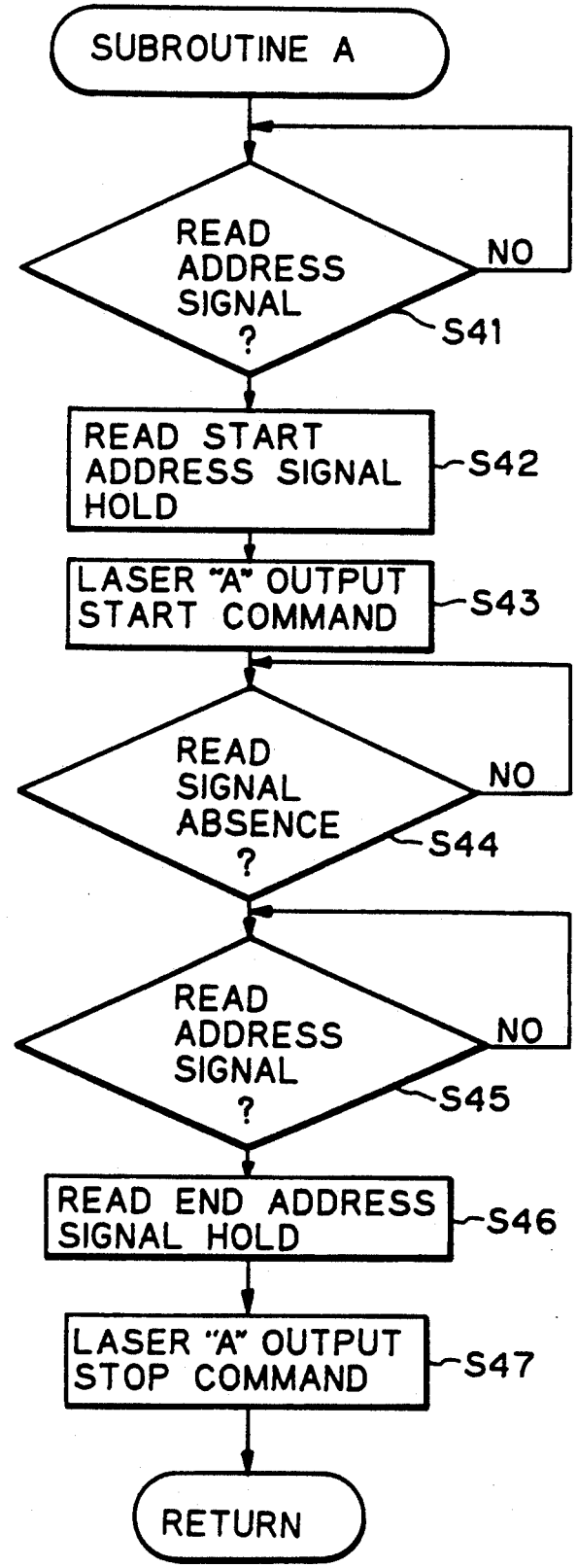
FIGS. 5A and 5B are flow charts explaining the read-out action of the read/write controller 9.
Figure 5B:
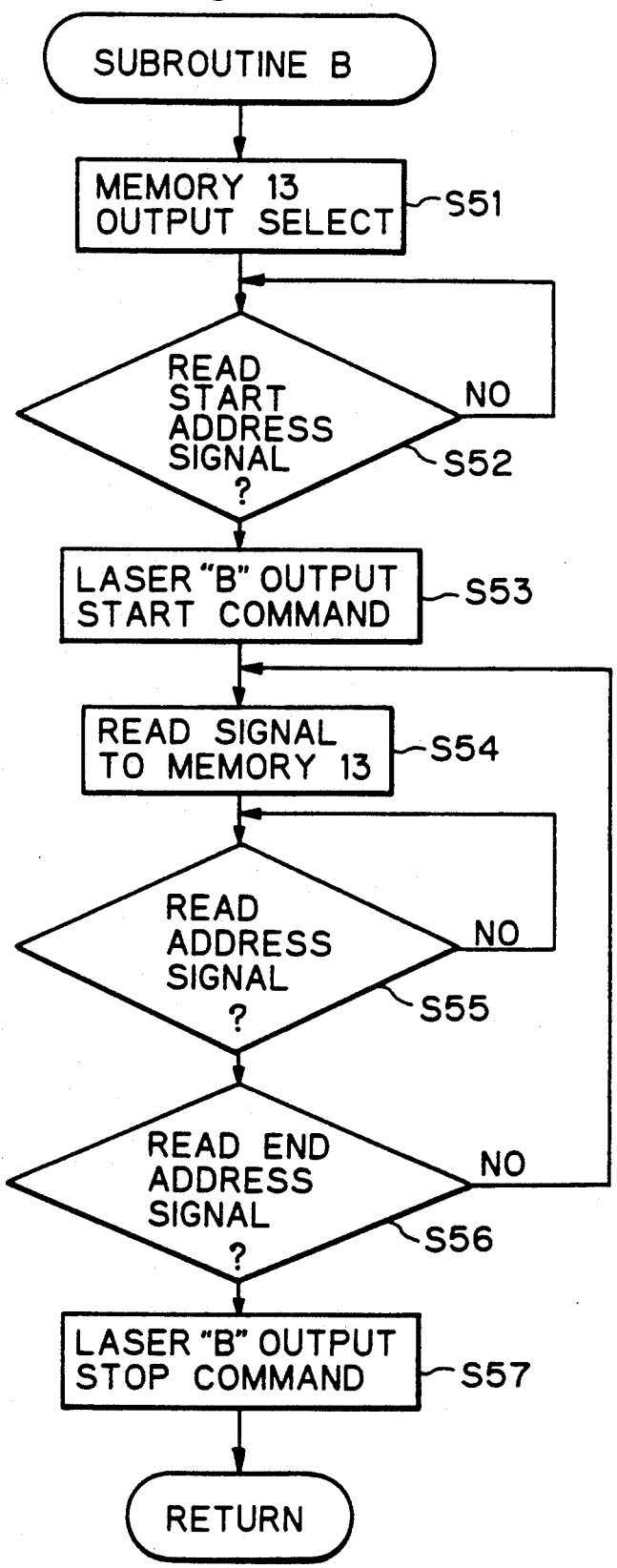

The read/write controller 12, when receiving a read command from the play controller during the standby state, shifts from the main control program to the subroutine shown in FIG. 5 and actuates the reader means to perform a subroutine A for reading and erasing the existing information signals and the writer means to perform a subroutine B for rewriting the information signals.

More particularly, the read/write controller 12 upon detecting an address signal from the preaddress reader 9 (Step S41) and recording it as the reading start position signal (Step S42) delivers an emission start signal to the laser emitter 2. As a result, a recorded signal on the track is retrieved and simultaneously, the information signals are erased from a corresponding data block by laser A (Step S43). The information signals are then transferred from the disk via the signal reproducer 8 to the buffer memory 13 where they are stored in sequence. The read/write controller 12 repeats the read and erase procedure of information signals until the read command signal becomes invalid. When the read command is deleted (Step S44), an address signal from the following data block is retrieved (Step S45) and stored as the read completion position signal (Step S46). In the end, the emission of the laser emitter 2 is ceased for stopping the erasing of existing information signals and the standby state is induced prior to returning to the main control program.

Accordingly in the subroutine A, the information signals can be retrieved and eliminated from the disk corresponding to the introduction of a read command signal.

In the subroutine B of the writer means triggered by the read/write controller 12, the signal selector switch 14 is selectively actuated for transferring an output from the buffer memory 13 (Step S51). When the address signal detected by the preaddress reader 25 matches an address signal stored at Step S42, a command signal is sent out from the read/write controller 12 to the laser emitter 19 for starting the emission (Steps S52, and S53) and the information signals per data block stored in the butter memory 13 are picked up (Step S54). Then, the data block which has been cleared off is reloaded with the same information signals. It is then examined whether the other address signal from the preaddress reader 25 corresponds or not with the read completion address signal recorded at Step S46 (Steps S55 and S56). If not, the recording of data into the data block is repeated for rewriting the retrieved information signals (Steps S54 to S56). The read/write controller 12 instructs the laser emitter 19 to stop the emission while the information signals following the read completion address signal are not yet retrieved nor eliminated at the time when the read completion address signal is read out and the writing of further information signals is halted (Step S57). Then, the standby state is induced and the procedure will move back to the main control program.

The recording of information signals is executed by forming color pits on the colorless track, as described in this embodiment, or colorless pits on the color track. Thereby, the (first or second) wavelength of a light beam to be used for focusing a reading or writing spot is determined depending on the pit arrangement of recording.

Figure 6:
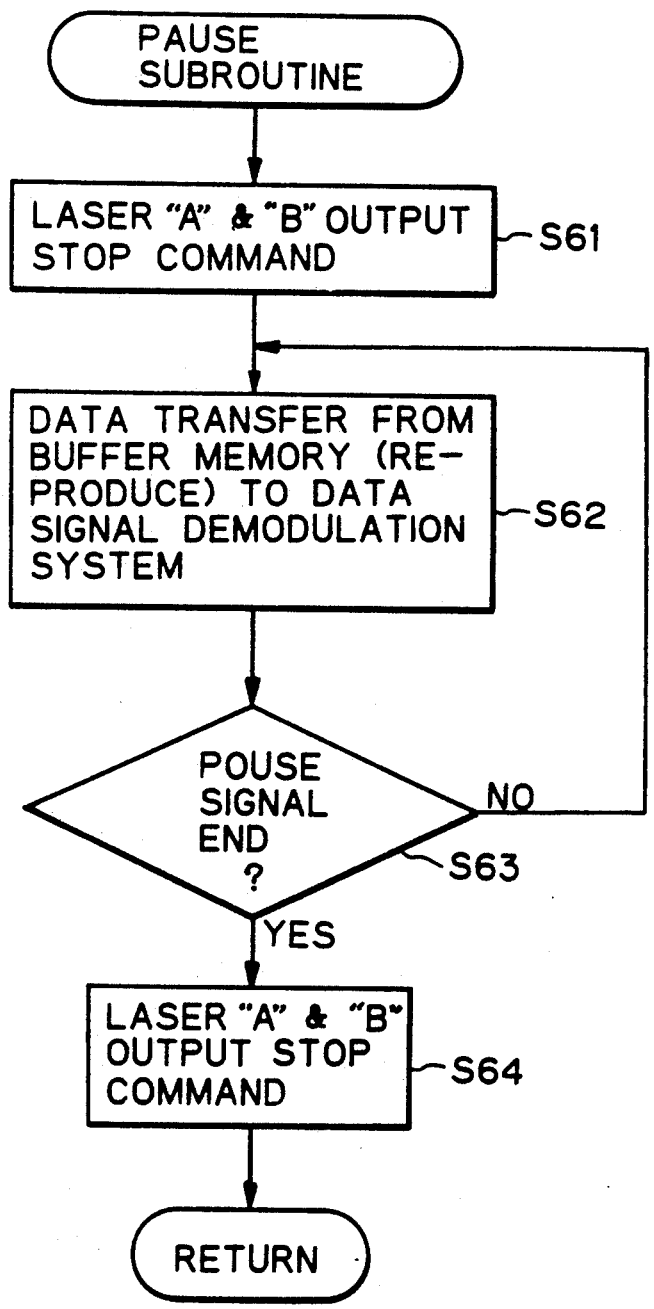
FIG. 6 is a flow chart explaining the pause action of the read/write controller 9.

The pause procedure will then be described. When a pause command is given, both the read and erase actions are temporarily halted and when dismissed, will start again from the next address to the stopped position. For example, when a pause command signal is transmitted from the play controller to the read/write controller 12 during the read procedure, the resultant interrupt takes place in the action of Step S44 or S55 of the flow chart shown in FIG. 5. Then, the read/write controller 12 performs a subroutine of pause operation, shown in FIG. 6, instead of the read operation subroutine. More specifically, the read/write controller 12 detects from the preaddress reader 9 an address signal of the information data just after the pause command signal and stores the same. Simultaneously, the read/write controller 12 instructs the laser emitter 2 or 16 to stop the emission of a light beam A or B (Step S61). At the time, the disk 1 is irradiated with the two light beams C and D only for tracking operation.

Then, the read/write controller 12 actuates the switch 18 to close and intermittently feeds one-track-jump-back command signals to the tracking servo circuit 10 or 26. Also, it gives an instruction for transferring the information signals read out just before the pause command and stored in the buffer memory 13 to the information signal demodulation circuit (Step S62) for reproduction. The transferring of the information signals continues until the pause command signal is canceled (Step S63). After the pause command signal is deleted, the switch 18 is turned open and the address signal just after the pause signal is retrieved from the preaddress reader 9 for restarting the emission of the light beam A or B (Step S64). During a period from the introduction of the pause command to this step, the read/write controller 12 keeps holding the address signal of the information data just after the pause command signal and the standby state is maintained. Hence, immediately after the delete of the pause signal, the procedure can be returned to the original step prior to interruption. As the pause action has been completed, the read/write controller 12 shifts from the pause subroutine to the read program shown in FIG. 5 or more particularly, Step S44 or S55.

It would be understood that the pause action can also be executed during the read or erase operation.

Although the aforementioned embodiment makes use of both a laser beam (referred to as an effective laser beam) having a wavelength which acts on the photochromic recording layer of a disk and another laser beam (referred to as an ineffective laser beam) having a particular wavelength which is not sensed by the photochromic recording layer and thus, employed for the tracking, a combination of the effective and ineffective laser beams may be used from which an RF signal and a tracking error signal are separately extracted by a known manner with a quarter-split photodetector which serves as a photoelectric transducer. Also, a conventional three-beam method may be employed with equal success in which the effective laser beam is situated at the center with two of the ineffective laser beams arranged on both sides thereof.

As described above, the photochromic optical disk read/write apparatus according to the present invention employs an ineffective laser beam for tracking and reading of address signals with the reader and writer means so that the tracking is carried out with only the ineffective laser beam in all modes except the erase and read mode. Accordingly, deterioration in the recorded and erased state quality of a photochromic recording medium will be minimized.

What is claimed is:

1. A photochromic optical disk read/write apparatus comprising:

reader means for reading information signals recorded on each track of a photochromic optical disk, each of said tracks comprising a series of pits for storing said information signals, said reader means reading information stored in said pits by focusing a reading beam of light on a reading point on the disk, writer means for writing desired information signals onto each of said tracks with a writing beam of light by focusing the writing beam on a writing point on the disk, signal processor means for processing and storing an information signal read by the reader means and for supplying said stored information signal to said writer means, such that said information signal read from the disk is re-recorded back onto said disk immediately after said information signal is read from the disk, and means for emitting a tracking light beam that has a longer wavelength than said reading and writing light beams, said reading light beam having a larger wavelength than said writing light beam.

2. A photochromic optical disk read/write apparatus, according to claim 1, wherein said processing means further comprises:

first and second tracking means, provided integrally with the reader and writer means, respectively, for emitting first and second tracking beams of light, each of which has a wavelength which is sufficiently higher than a wavelength of the reading and writing beams that said first and second tracking beams do not affect the information stored on the photochromic optical disk, said first and second tracking means performing tracking operations based on reflections of the first and second tracking light beams, respectively.

3. A photochromic optical disk read/write apparatus, according to claim 1, wherein said reading point is positioned adjacent to said writing point along one track of the disk.

4. A photochromic optical disk read/write apparatus, according to claim 1, wherein said reading point and said writing point are located at symmetrical points about the center of the disk.

5. A photochromic optical disk read/write apparatus, according to claim 1, wherein said reading beam of light has a first wavelength that has an affect on a state of the pits on the disk, such that said reading beam of light simultaneously reads a state of each pit and erases information stored at said pit.

6. A photochromic optical disk read/write apparatus, according to claim 1, wherein said signal processor means further comprising: buffer memory means, connected between the reading and writing means, for storing information read by the reader means and for feeding the stored information to the writing means, in order for the writing means to rewrite the read information back to the disk immediately after the read information is read and erased from the disk.

7. A photochromic optical disk read/write apparatus, according to claim 6, wherein said writing means automatically and immediately rewrites information read and erased from the disk.

8. A photochromic optical disk read/write apparatus, according to claim 1, wherein said reading means simultaneously reads and erases information on the disk.

9. A photochromic optical disk read/write apparatus, according to claim 1, wherein said processing means controls the reader means to read a block of information from a desired block on the disk and controls the writer means to rewrite the block of information back to said desired block.

10. A photochromic optical disk read/write apparatus, according to claim 1, wherein said reading beam has a wavelength sufficiently low that said reading beam simultaneously reads and erases information signals recorded on the disk.

11. A photochromic optical disk read/write apparatus comprising:
reader means for reading information signals recorded on each track of a photochromic optical disk, each of said tracks comprising a series of pits for storing said information signals, said reader means reading information stored in said pits by focusing a reading beam of light on a reading point on the disk,
writer means for writing desired information signals onto each of said tracks with a writing beam of light by focusing the writing beam on a writing point on the disk, and
signal processor means for processing and storing an information signal read by the reader means and for supplying said stored information signal to said writer means, such that said information signal read from the disk is re-recorded back onto said disk immediately after said information signal is read from the disk, wherein said processing means further comprises:
first and second tracking means, provided integrally with the reader and writer means, respectively, for emitting first and second tracking beams of light, each of which has a wavelength which is sufficiently higher than a wavelength of the reading and writing beams that said first and second tracking beams do not affect the information stored on the photochromic optical disk, said first and second tracking means performing tracking operations based on reflections of the first and second tracking light beams, respectively.

12. A photochromic optical disk read/write apparatus comprising:
reader means for reading information signals recorded on each track of a photochromic optical disk, each of said tracks comprising a series of pits for storing said information signals, said reader means reading information stored in said pits by focusing a reading beam of light on a reading point on the disk, said reading means simultaneously reading and erasing said information on the disk,
writer means for writing desired information signals onto each of said tracks with a writing beam of light by focusing the writing beam on a writing point on the disk, and
signal processor means for processing and storing an information signal read by the reader means and for supplying said stored information signal to said writer means, such that said information signal read from the disk is re-recorded back onto said disk immediately after said information signal is read from the disk.

13. A photochromic optical disk read/write apparatus comprising:
reader means for reading information signals recorded on each track of a photochromic optical disk, each of said tracks comprising a series of pits for storing said information signals, said reader means reading information stored in said pits by focusing a reading beam of light on a reading point on the disk,
writer means for writing desired information signals onto each of said tracks with a writing beam of light by focusing the writing beam on a writing point on the disk, said writing means automatically and immediately rewriting information read and erased from the disk, and
signal processor means for processing and storing an information signal read by the reader means and for supplying said stored information signal to said writer means, such that said information signal read from the disk is re-recorded back onto said disk immediately after said information signal is read from the disk.

14. A photochromic optical disk read/write apparatus comprising:
reader means for reading information signals recorded on each track of a photochromic optical disk, each of said tracks comprising a series of pits for storing said information signals, said reader means reading information stored in said pits by focusing a reading beam of light on a reading point on the disk,
writer means for writing desired information signals on to each of said tracks with a writing beam of light by focusing the writing beam on a writing point on the disk, and signal processor means for processing and storing an information signal read by the reader means and for supplying said stored information signal to said writer means, such that said information signal read from the disk is re-recorded back onto said disk immediately after said information signal is read from the disk, said processing means controlling the reader means to read a block of information from a desired block on the disk and controlling the writer means to rewrite the block of information back to said desired block.

* * * * *